(12) United States Patent
Zhou et al.

(10) Patent No.: US 12,307,365 B2
(45) Date of Patent: May 20, 2025

(54) NETWORK MODEL TRAINING METHOD AND APPARATUS, ELECTRONIC APPARATUS AND COMPUTER-READABLE STORAGE MEDIUM

(71) Applicant: INSPUR SUZHOU INTELLIGENT TECHNOLOGY CO., LTD., Jiangsu (CN)

(72) Inventors: Zhenzhen Zhou, Jiangsu (CN); Feng Li, Jiangsu (CN); Hongli Liu, Jiangsu (CN); Xiaolan Zhang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/259,682

(22) PCT Filed: Oct. 29, 2021

(86) PCT No.: PCT/CN2021/127535
§ 371 (c)(1),
(2) Date: Jun. 28, 2023

(87) PCT Pub. No.: WO2023/024252
PCT Pub. Date: Mar. 2, 2023

(65) Prior Publication Data
US 2024/0265251 A1 Aug. 8, 2024

(30) Foreign Application Priority Data
Aug. 24, 2021 (CN) .......................... 202110971264.1

(51) Int. Cl.
*G06N 3/08* (2023.01)
*G06N 3/04* (2023.01)
*G06N 20/00* (2019.01)

(52) U.S. Cl.
CPC .................. *G06N 3/08* (2013.01); *G06N 3/04* (2013.01); *G06N 20/00* (2019.01)

(58) Field of Classification Search
CPC ............. G06N 3/08; G06N 3/04; G06N 20/00
See application file for complete search history.

(56) References Cited

U.S. PATENT DOCUMENTS 11,080,596 B1    8/2021  Makhijani et al.
2021/0012239 A1  1/2021  Arzani et al.

FOREIGN PATENT DOCUMENTS

CN    106062786 A    10/2016
CN    108305296 A    7/2018
(Continued)

OTHER PUBLICATIONS

Wang, Chuan-Chi, et al. "Toward accurate platform-aware performance modeling for deep neural networks." ACM SIGAPP Applied Computing Review 21.1 (2021): 50-61. (Year: 2021).*
(Continued)

*Primary Examiner* — Michael J Huntley
*Assistant Examiner* — Sehwan Kim
(74) *Attorney, Agent, or Firm* — Dennemeyer & Associates LLC (57) ABSTRACT

This disclosure discloses a network model training method and apparatus, an electronic apparatus and a computer-readable storage medium. The method includes: acquiring training data and inputting the training data into an initial model to obtain output data, wherein the initial model includes an embedding layer, the embedding layer is constructed based on preset network layer latency information, the preset network layer latency information includes network layer types and at least two types of latency data corresponding to each network layer type, and each type of latency data corresponds to different device types; inputting (Continued)

a current device type and a target network layer type of each target network layer in the initial model into the embedding layer to obtain target latency data corresponding to other device type; calculating a target loss value based on the target latency data, the training data and the output data, and adjusting parameters of the initial model based on the target loss value; and obtaining a target model based on the initial model in response to a training completion condition is satisfied. By means of the method, the target model has a minimum latency when running on a device corresponding to the other device type.

20 Claims, 3 Drawing Sheets

(56) References Cited

FOREIGN PATENT DOCUMENTS

| CN | 111667024 A | 9/2020 |
|---|---|---|
| CN | 111723901 A | 9/2020 |
| CN | 111787066 A | 10/2020 |
| CN | 112016666 A | 12/2020 |
| CN | 113159284 A | 7/2021 |
| CN | 113420880 A | 9/2021 |

OTHER PUBLICATIONS

Lee, Hayeon, et al. "Help: Hardware-adaptive efficient latency prediction for nas via meta-learning." arXiv preprint arXiv:2106. 08630 (2021). (Year: 2021).*

Liao, Ying-Chiao, et al. "Perfnetrt: Platform-aware performance modeling for optimized deep neural networks." 2020 International Computer Symposium (ICS). IEEE, 2020. (Year: 2020).*

Ponomarev, Evgeny, Sergey Matveev, and Ivan Oseledets. "LETI: latency estimation tool and investigation of neural networks inference on mobile GPU." arXiv preprint arXiv:2010.02871 (2020). (Year: 2020).*

International search report for PCT/CN2021/127535 mailed on May 19, 2022.

Search report 1 for Chinese application 202110971264.1, filed Aug. 24, 2021.

Search report 2 for Chinese application 202110971264.1, filed Aug. 24, 2021.

* cited by examiner

NETWORK MODEL TRAINING METHOD AND APPARATUS, ELECTRONIC APPARATUS AND COMPUTER-READABLE STORAGE MEDIUM

This disclosure claims priority to Chinese Patent Application No. 202110971264.1, entitled "Network Model Training Method and Apparatus, Electronic Apparatus and Computer-readable Storage Medium", filed with the China National Intellectual Property Administration on Aug. 24, 2021, which is incorporated herein by reference in its entirety.

TECHNICAL FIELD

This disclosure relates to the field of the computer technology, and more particularly relates to a network model training method, a network model training apparatus, an electronic apparatus and a computer-readable storage medium.

BACKGROUND

At present, in order to improve a training speed of a network model, the network model is usually constructed and trained on an electronic apparatus with high computing capability, such as a server, and after training is finished, the network model is transmitted to a terminal apparatus, such as a mobile phone and a personal computer to run; or the network model is trained on a specified apparatus as required, and executed the other apparatus. Because a server apparatus and the terminal apparatus have different computing capabilities for the same type of network layer, execution latencies of multiple network layers in the same network on different kinds of apparatus are usually different, such that the latency of the network model trained on one apparatus is high during operation on the other apparatus.

SUMMARY

In view of this, an objective of this disclosure is to provide a network model training method, a network model training apparatus, an electronic apparatus and a computer-readable storage medium, which make a finally trained target model have a minimum latency during operation on a apparatus corresponding to other device type.

To solve the above problem, this disclosure provides the network model training method, including:
training data is acquired, and the training data is input into an initial model to obtain output data,
where the initial model includes an embedding layer, the embedding layer is constructed based on preset network layer latency information, the preset network layer latency information includes network layer types and at least two types of latency data corresponding to each network layer type, and each type of latency data corresponds to different device types;
a current device type and a target network layer type of a target network layer in the initial model are input into the embedding layer to obtain target latency data corresponding to other device type;
a target loss value is calculated based on the target latency data, the training data and the output data, and parameters of the initial model are adjusted based on the target loss value; and
a target model is obtained based on the initial model in response to a training completion condition being satisfied.

In an embodiment, the preset network layer latency information being generated includes:
multiple network layers and multiple preset network models with each network layer of the multiple network layers are determined;
the preset network models on devices corresponding to multiple device types are trained to obtain first latency data corresponding to the multiple device types;
second latency data corresponding to the each network layer of the multiple network layers is obtained based on the first latency data, respectively; and
the preset network layer latency information is generated based on a corresponding relationship among the second latency data, the network layer type of the each network layer, and a device type of multiple device types.

In an embodiment, the target loss value is calculated based on the target latency data, the training data and the output data includes:
a precision loss value is obtained based on the training data and the output data; and
weighting summation is performed based on the precision loss value and the target latency data to obtain the target loss value.

In an embodiment, the initial model is a hyperparameter network based on a neural network model training rule, and the initial model is the hyperparameter network constructed by utilizing a search space. A network architecture of the initial model corresponds to a target directed acyclic graph, the target directed acyclic graph has multiple directed edges, and each directed edge has multiple branches.

The inputting the training data into the initial model to obtain output data includes:
a target parameter is determined; and
activation branches corresponding to the each directed edge are determined based on the target parameter, and the training data is processed based on the activation branches to obtain the output data.

parameters of the initial model are adjusted based on the target loss value includes:
the target parameter corresponding to the activation branches is updated based on the target loss value, wherein a historical parameter of previous update is different from the target parameter in parameter type.

In an embodiment, the activation branches corresponding to the each directed edge is determined based on the target parameter includes:
the activation branches are randomly determined in response to the target parameter being a weight parameter; and
the activation branches are selected based on a polynomial distributed sampling principle in response to the target parameter being an architecture parameter.

In an embodiment, the target parameter is updated corresponding to the activation branches based on the target loss value includes:
in response to the target parameter being the weight parameter, a weight parameter of the activation branches are updated based on the target loss value through a random gradient descent method; and
in response to the target parameter being the architecture parameter, an update parameter through utilizing the target loss value is calculated based on a preset update rule, and the architecture parameter of the activation branches are updated based on the update parameter.

In an embodiment, the target model is obtained based on the initial model includes:
through the architecture parameter and the weight parameter, a branch weight corresponding to each branch is calculated; and
a highest branch weight of each directed edge is determined, and branches corresponding to non-highest branch weights in the initial model are clipped to obtain the target model.

In an embodiment, the current device type, the target network layer type of each target network layer in the initial model are input into the embedding layer to obtain target latency data corresponding to another device type includes:
the current device type, each target network layer type and target data are input into the embedding layer to obtain the target latency data corresponding to the target data, wherein the target data includes an input data scale and/or a target device type.

This disclosure provides a network model training apparatus, including:
an input module is configured to acquire training data, and input the training data into an initial model to obtain output data,
where the initial model includes an embedding layer, the embedding layer is constructed based on preset network layer latency information, the preset network layer latency information includes network layer types and at least two types of latency data corresponding to each network layer type, and each type of latency data corresponds to different device types;
a latency acquiring module is configured to input a current device type, a target network layer type of each target network layer in the initial model into the embedding layer to obtain target latency data corresponding to other device type;
a parameter adjusting module is configured to calculate a target loss value based on the target latency data, the training data and the output data, and adjust parameters of the initial model based on the target loss value; and
a model generation module is configured to obtain a target model based on the initial model in response to a training completion condition being satisfied.

This disclosure provides an electronic apparatus, including a memory and a processor, wherein the memory is configured to store a computer program; and
the processor is configured to execute the computer program to implement the above network model training method.

This disclosure provides a computer-readable storage medium. The computer-readable storage medium is configured to store a computer program. The computer program, when executed by a processor, implementing the above network model training method.

The network model training method provided by this disclosure includes: acquiring the training data and inputting the training data into the initial model to obtain the output data, wherein the initial model includes the embedding layer, the embedding layer is constructed based on the preset network layer latency information, the preset network layer latency information includes network layer types and the at least two types of latency data corresponding to each network layer type, and the each type of latency data corresponds to the different device types; inputting the current device type, the target network layer type of each target network layer in the initial model into the embedding layer so as to obtain the target latency data corresponding to the other device type; calculating the target loss value based on the target latency data, the training data and the output data, and adjusting the parameters of the initial model based on the target loss value; and obtaining the target model based on the initial model in response to the training completion condition being satisfied.

It is apparent that in the network model training method, the initial model includes the embedding layer, the embedding layer is constructed based on the preset network layer latency information, and the preset network layer latency information includes the network layer types and at least two types of latency data corresponding to each network layer type. In response to the initial model being trained, the parameters therein are required to be adjusted, and the loss value is a benchmark for parameter adjustment. Because the different devices have different execution latencies for the different types of network layers, in response to training being performed on the current device, to obtain the target model with a low latency on other device, the current device type and the network layer type of each target network layer in the initial model may be input into the embedding layer, such that the embedding layer obtains the target latency data corresponding to the target network layers on the non-current devices based on the preset network layer latency information, thereby utilizing the target latency data for calculation of the target loss value. That is, the target loss value is calculated not based on a real latency generated in response to the initial model processes the training data on the current device but based on a theoretical latency generated in response to the initial model processes the training data on a device corresponding to other device type. The adopted target latency data does not correspond to the current device type, but is matched with the other device type. Thus, the obtained target loss value may reflect the execution latency of the initial model on the device corresponding to the another device type and is utilized for adjusting the parameters of the initial model, such that the initial model can be more matched with the device corresponding to the another device type, the effect of simulating direct initial model training on the device corresponding to the another device type is achieved, and the target model finally trained has a minimum latency when running on the device corresponding to the other device type. The problem that the latency is high in the related technologies is solved.

In addition, this disclosure further provides a network model training apparatus, an electronic apparatus and a computer-readable storage medium, which similarly have the above beneficial effects.

BRIEF DESCRIPTION OF THE DRAWINGS

In order to describe methods in embodiments of this disclosure or in the related technologies more clearly, the drawings required to be used in descriptions of the embodiments or the related technologies will be simply introduced below, obviously, the drawings described below are only some embodiments of this disclosure, and those of ordinary skill in the art can obtain other drawings based on the provided drawings without creative work.

DETAILED DESCRIPTION OF THE EMBODIMENTS

To make purposes, methods and advantages of embodiments of this disclosure more clear, the methods in the embodiments of this disclosure are clearly and integrally described in combination with drawings in the embodiments of this disclosure as below, and it is apparent that the described embodiments are only a part rather all of embodiments of this disclosure. All other embodiments obtained by those of ordinary skill in the art based on the embodiments of this disclosure without creative efforts shall fall within the scope of protection of this disclosure.

Figure 1:
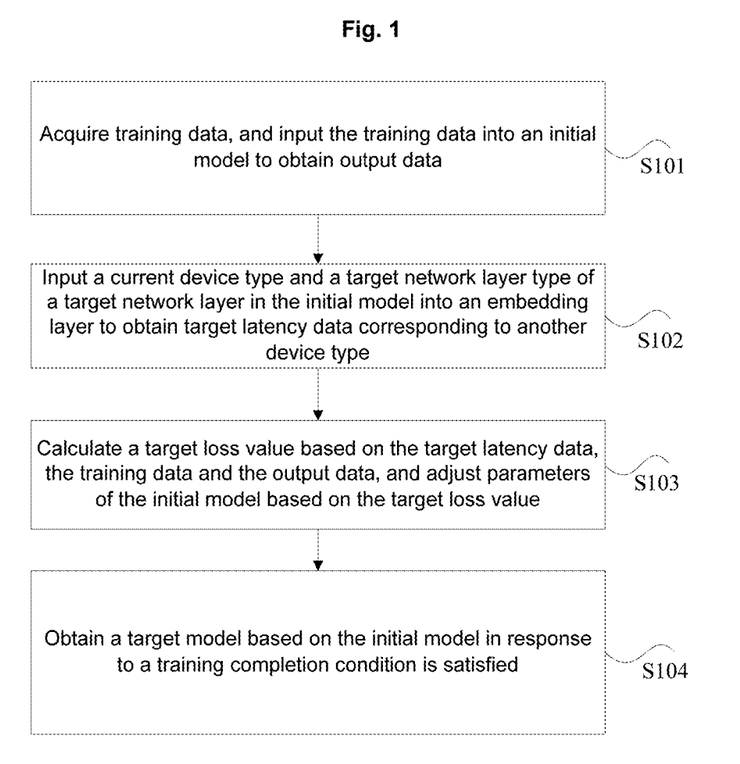
FIG. 1 is a flowchart of a network model training method based on an embodiment of this disclosure.

Refer to FIG. 1, and FIG. 1 is a flowchart of the network model training method based on an embodiment of this disclosure. The network model training method includes:
at step S101: training data is acquired, and the training data is input into an initial model to obtain output data.

It should be noted that in this application, a target model is trained on a type of device and invoked on an other type of device, and the device for model training and the device for model invoking are different in device type. The device type, structure and application scenario of the target model are not limited, thus, the structure and type of the initial model corresponding to the target model are not limited neither. The initial model refers to the target model not trained yet, and in the training process of the initial model or after the initial model satisfies a training completion condition, the initial model may be determined as the target model. In an embodiment, the initial model is a model with a fixed structure, and in this situation, the structure of the target model is fixed as well. In an embodiment, the initial model is an initial hyperparameter network model in the neural architecture search process, and in this situation, the target model and the initial model are different in structure, and a model structure of the initial model after neural architecture search is the structure of the target model.

For the content of the training data, it is to be understood that the content and type of the training data may vary based on different disclosure scenarios of the target model. In an embodiment, the target model can be classified based on targeted purposes. For example, the target model may be an image processing model for image processing, or an audio processing model for audio processing, a classification model for classification, or a cluster model for clustering, or a recommendation model for recommendation, etc. The content of the training data may vary based on different purposes of the target model, such as images, audios, or data satisfying model purpose requirements.

Along with booming of deep learning, particularly development of neural networks, the era of conventional machine learning feature engineering is overthrown, which pushes artificial intelligence to the highest point in history. However, although multiple neural network models emerge in endlessly, the higher the model performance is, the stricter the requirements for hyperparameters becomes, and slight differences may result in the inability to reproduce the results of the paper. The network structure serving as a special hyperparameter plays an important role in the whole process of deep learning. The network structures such as a ResNet model performing excellently in an image classification task and a Transformer model dominating in a machine translation task are well designed by experts without exception. Behind these elaborated network structures are profound theoretical researches and a large number of extensive experiments, which undoubtedly brings new challenges to people. Neural Architecture Search (NAS) is an automatic neural network design technology, which can automatically design, through an algorithm, a high-performance network structure based on a sample set, and effectively reduce usage and implementation cost of the neural network.

The training data serves as the input of the initial model, and the initial model is utilized for processing the training data to obtain the output data. The output data may only include final output data of the initial model. In an embodiment, the output data may further include intermediate data obtained in the process of processing the training data through the initial model.

At step S102: a current device type a target network layer type of each target network layer in the initial model are input into an embedding layer to obtain target latency data corresponding to other device type.

The initial model includes the embedding layer, the embedding layer is constructed based on preset network layer latency information, the preset network layer latency information includes network layer types and at least two types of latency data corresponding to each network layer type, and each type of latency data corresponds to different device types. That is, the preset network layer latency information includes multiple sets of information, and each set of information records at least two types of latency data and a corresponding relationship between the network layer types corresponding to the two types of latency data. It should be noted that the latency data refers to data representing latency of the network layer type during operation on the corresponding device, which has an unlimited specific form. Because the same type of network layer is different in latency during operation on different electronic devices, parameters of the network layer similarly have an influence on operation latency. In response to one model being trained on a device A, the model is usually adjusted based on execution latency of multiple network layers on the device A, and thus, after training is finished, in response to the model runs on a device B different from the device A, the operation latency cannot be minimized usually.

In order to solve the above problem and make latency of the model trained on the device A minimized on the device B as well, this application generates the preset network layer latency information in advance and constructs the embedding layer based on the preset network layer latency information. The embedding layer is located in the initial model, and may obtain the target latency data corresponding to the another device type based on the current device type and the target network layer type of each target network layer in the initial model, thereby subsequently a target loss value is constructed based on the target latency data and the model parameters are adjusted based on the target loss value.

The current device type refers to a type of a device configured to train the initial model to obtain the target model, which has an unlimited form, such as a server, or a personal computer, or a certain model of server, or a certain model of personal computer. The target network layer refers to a network layer in the initial model, and the target network layer type refers to a type of the target network layer, such as a 3*3 convolutional layer or a pooling layer. The preset network layer latency information may be mapped into a corresponding one-dimensional array, which is equivalent to dimensionality reduction on a sparse matrix corresponding to the preset network layer latency information, and embedding layer construction based on a vector. The embedding layer may perform search mapping based on the input information to obtain the target latency data corresponding to the other device type. The other device type is not the current device type.

In an embodiment, the preset network layer latency information includes two types of latency data, and in this situation, after inputting the current device type, there is only one type of latency data remaining to serve as the target latency data. In an embodiment, the preset network layer latency information may include two or more types of latency data, and in this situation, after inputting the current device type, there are at least two types of latency data remaining to serve as the target latency data. At the time, one type of latency data may be selected from the at least two types of latency data as required to serve as the target latency data. In an embodiment, the process of the current device type and the target network layer type of the target network layer in the initial model input into the embedding layer to obtain target latency data corresponding to other device type may include the following steps:

At step S11: the current device type, each target network layer type and target data are input into the embedding layer to obtain the target latency data corresponding to the target data.

In an embodiment, after the current device type and each target network layer type are input into the embedding layer, the target data may also be input into the embedding layer, such that the proper target latency data can be selected as required. The target data includes an input data scale and/or a target device type. The target device type refers to a type of a device on which a target network is invoked. Because different scales of the input data similarly will influence latency of the network layer, the target data may further include the input data scale, thereby the more accurate target latency data is obtained.

It is to be understood that before the embedding layer is constructed based on the preset network layer latency information, multiple device types, network layer types and corresponding latency are required to be first acquired to generate the preset network layer latency information. In an embodiment, the process of the preset network layer latency information is generated includes:

At step S21: multiple network layers and multiple preset network models with each network layer of the multiple network layers are determined.

At step S22: the multiple preset network models are trained on devices corresponding to various device types to obtain first latency data, wherein the first latency data corresponds to the various device types.

At step S23: second latency data corresponding to the each network layer of the multiple network layers is obtained based on the first latency data.

At step S24: preset network layer latency information is generated based on a corresponding relationship among the second latency data, the network layer type of the each network layer, and a device type of multiple device types.

The execution latency of the network layer is influenced by parameters, and thus, latency of the network layer cannot be directly determined by the singe network layer, which requires to invoke the whole network model. In an embodiment, multiple types of network layers are selected to generate the preset network layer latency information, one type of network layer may be owned by multiple different types of network models, and thus, after the network layer is determined, the multiple preset network models with the network layer may be further determined based on the network layer. The multiple preset network models are trained on multiple different types of devices, which may determine overall invoke latency of the preset network models on the devices. The first latency data refers to invoke latency data of the preset network model. Latency of the network layer is a part of the first latency data, and the first latency data may be utilized for obtaining the second latency data corresponding to the multiple types of network layers. After the second latency data is obtained, the preset network layer latency information is generated based on the corresponding relationship among the second latency data, the network layer type of the each network layer of the multiple network layers and the device types.

For example, the conv3*3 (i.e., the 3*3 convolutional layer) network layer exists in a model such as an R-CNN (Region-CNN, CNN being Convolutional Neural Networks) and a Fast R-CNN (an updated version of R-CNN), and in this situation, a model with conv3*3 may be determined as the preset network model. In an embodiment, to obtain the more accurate target latency data, conv3*3 with different input data scales in the preset network models may be regarded as different types of network layers. For an image, input data scales may include a channel (C-channel), a height (H-height), a width (W-width) and a depth (D-depth). Latency corresponding to each type of conv3*3 may be obtained through training, and is subjected to statistics shown in Table 1.

TABLE 1 conv3*3 latency statistics

| Layer number statistics | C | H | W | D | Client side Latency | Server side Latency |
|---|---|---|---|---|---|---|
| R-CNN-1 | C1 | H1 | W1 | D1 | $L_{User-1}$ | $L_{server-1}$ |
| R-CNN-2 | C2 | H2 | W2 | D2 | $L_{User-2}$ | $L_{server-2}$ |
| ... | | | | | | |
| Faster R-CNN-1 | Cn | Hn | Wn | Dn | $L_{User-n}$ | $L_{server-n}$ |
| ... | | | | | | |
| RetinaNet-1 | Cm | Hm | Wm | Dm | $L_{User-m}$ | $L_{server-m}$ |
| ... | | | | | | |
| RetinaNet-x | Ct | Ht | Wt | Dt | $L_{User-t}$ | $L_{server-t}$ |

Wherein $L_{server}$ denotes server side latency, and $L_{user}$ denotes client side latency, which are the second latency data. There are totally two device types shown in Table 1, including a client side and a server side. In the column of layer number statistics, different network layers have different input data scales, that is, the network layer of R-CNN-1 conv3*3 and the network layer of R-CNN-2 conv3*3 are different in input data scale. Based on the above manner, similar processing is performed on other selected network layers to obtain the complete preset network layer latency information.

At step S103: a target loss value is calculated based on the target latency data, the training data and the output data, and parameters of the initial model are adjusted based on the target loss value.

After the target latency data is obtained, the target loss value may be calculated based on the target latency data, the training data and the output data, and then, parameter adjustment is performed on the initial model based on the target loss value. A computing mode for the target loss value is not limited by this embodiment. For example, a precision loss value may be calculated based on the training data and the output data, and the target loss value is generated based on the precision loss value and the target latency data, that is, the process of the target loss value is calculated based on the target latency data, the training data and the output data includes:

At step S31: a precision loss value is obtained based on training data and output data.

At step S32: weighting summation is performed based on the precision loss value and the target latency data to obtain the target loss value.

In an embodiment, the target loss value is calculated in a weighting summation manner. In an embodiment, the target loss value may also be generated by adopting other computing modes.

At step S104: the target model is obtained based on the initial model in response to a training completion condition being satisfied.

The training completion condition refers to a condition for determining ending of the initial model training process, which may limit the initial model or limit the initial model training process, such as a condition for limiting a degree of convergence, a recognition accuracy rate, etc. of the initial model, or a condition for limiting a training duration, a training round, etc. In response to the training completion condition being satisfied, the target model may be obtained based on the initial model, and this embodiment does not limit a specific manner for obtaining the target model, for example, the embedding layer in the initial model may be removed to obtain the target model.

By applying the network model training method provided by the embodiment of this disclosure, the initial model includes the embedding layer, the embedding layer is constructed based on the preset network layer latency information, and the preset network layer latency information includes the network layer types and the at least two types of latency data corresponding to each network layer type. In response to the initial model being trained, the parameters therein are required to be adjusted, and the loss value is a benchmark for parameter adjustment. Because the different devices have different execution latencies for the different types of network layers, in response to training being performed on the current device, to obtain the target model with a low latency on other device, the current device type and the network layer type of each target network layer in the initial model may be input into the embedding layer, such that the embedding layer obtains the target latency data corresponding to the target network layers on the non-current devices based on the preset network layer latency information, thereby utilizing the target latency data for calculation of the target loss value. That is, the target loss value is calculated not based on a real latency generated when the initial model processes the training data on the current device but based on a theoretical latency generated when the initial model processes the training data on a device corresponding to the other device type. The adopted target latency data does not correspond to the current device type, but is matched with the other device type. Thus, the obtained target loss value may reflect the execution latency of the initial model on the device corresponding to the another device type and is utilized for adjusting the parameters of the initial model, such that the initial model can be more matched with the device corresponding to the another device type, the effect of simulating direct initial model training on the device corresponding to the other device type is achieved, and the target model finally trained has a minimum latency when running on the device corresponding to the another device type. The problem that the latency is high in the related technologies is solved.

Based on the above embodiment, in an embodiment, the initial model is the hyperparameter network based on a neural network model training rule, and the initial model is the hyperparameter network constructed by utilizing a search space. A network architecture of the initial model corresponds to a target directed acyclic graph, the target directed acyclic graph has multiple directed edges, and each directed edge has multiple branches. In the initial model training process, the multiple branches may be assessed and are finally selected to be clipped, thereby obtaining the target model.

The neural network model training rule refers to generating a most initial model during network architecture search, namely the initial model. The search space refers to the type of neural networks capable of being searched, and meanwhile defines how to describe a neural network structure. In an embodiment, the search space includes network layers such as MBConv3*3_1 (representing a convolution kernel being 3*3, and a step length being 1), MBConv3*3_2, MBConv3*3_3, MBConv3*3_4, MBConv3*3_5, MBConv3*3_6, MBConv5*5_1, MBConv5*5_2, MBConv5*5_3, MBConv5*5_4, MBConv5*5_5, MBConv5*5_6, MBConv7*7_1, MBConv7*7_2, MBConv7*7_3, MBConv7*7_4, MBConv7*7_5, MBConv7*7_6, Identity and Zero, where Identity is a placeholder layer, and Zero is a 0 operation layer. The 0 operation layer is added to the search space, a skip connection manner may be allowed to construct a deeper network, such that network depth and width balance is kept, which makes the model have higher precision.

The initial model may be defined as N ($e_1 \ldots e_n$), where $e_i$ denotes an edge of the directed acyclic graph, and O={$o_i$}, i∈(1, N) denotes N optional basic operations, namely N branches. In order to construct the hyperparameter network including all architectures of the search space, this embodiment uses a method for defining the basic operation through each edge, the edges are defined as a series of mixed operations including N parallel paths, which may be denoted by $m_o$, and the whole initial model is denoted by N ($e_1=m_o^1 \ldots e_n=m_o^n$), and for the input x, the mixed operation $m_o$ may be defined as the output of the N paths, that is:

$$m_o^{NAS}(x) = \sum_{i=1}^{N} p_i o_i(x) = \sum_{i=1}^{N} \frac{\exp(a_i)}{\sum_j \exp(a_j)} o_i(x)$$

Wherein, $m_o^{NAS}(x)$ denotes the output. Wherein $a_i$ denotes the architecture parameter, and the architecture parameter refers to a parameter for model architecture selection, which participates in branch selective clipping. Each branch corresponds to one architecture parameter. It can be seen that training an ordinary network model only requires calculation and storage on one branch, and when the above initial model is trained through a conventional training mode, N times of video memory and calculation duration of a graphics processing unit (GPU) are required.

At present, due to a large number of model branches, during training, in order to shorten training time and reduce consumption of training resources, a single module is usually trained, and a small amount of training data of a proxy task is utilized for training multiple branches in the module. After training is finished, the module is repeatedly utilized to obtain the final model. However, although the scale of the trained module is smaller than that of the model, training by the small amount of training data consumes few resources, more calculation resources are still consumed in the model generation process.

Figure 2:
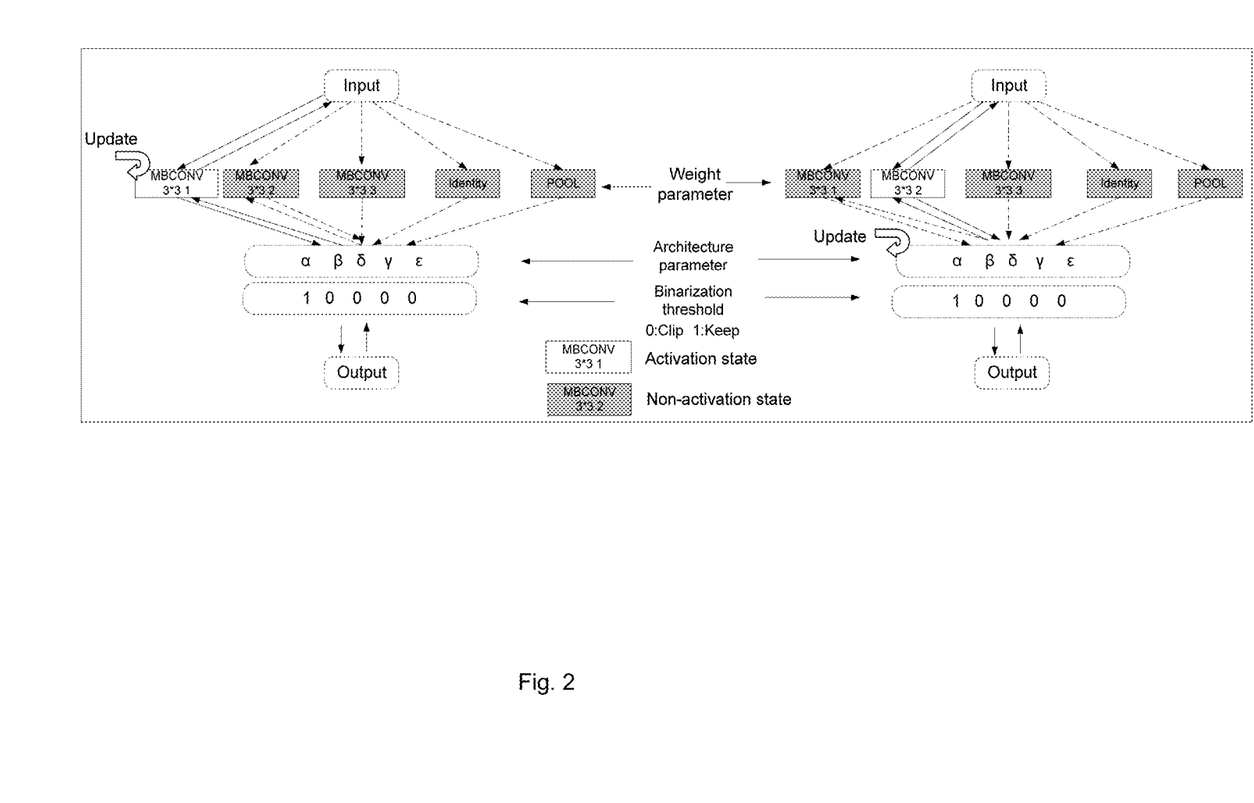
FIG. 2 is a schematic diagram of a specific neural architecture search process based on an embodiment of this disclosure.

Refer to FIG. 2, and FIG. 2 is a schematic diagram of a neural architecture search process based on an embodiment of this disclosure. In order to solve the above problem, the process of the above hyperparameter network is trained and the training data is input into the initial model to obtain the output data in this disclosure may include:

At step S41: a target parameter is determined.

At step S42: based on the target parameter, activation branches corresponding to each directed edge are determined, and the training data is processed based on the activation branches to obtain output data.

The target parameter may be a weight parameter or architecture parameter. The weight parameter refers to a parameter representing a branch weight and is used for being matched with the architecture parameter for branch selection. During training each time, a parameter required to be updated in current training is selected as the target parameter. After the target parameter is determined, one of the branches of the directed edges is selected as the activation branch, and the training data is processed by the activation branches to obtain the output data. In an embodiment, a binarization gate function may be utilized for selecting and activating the branches. In an embodiment, the binarization gate function is:

$$g = \text{binarize}(p_1, \ldots, p_N) = \begin{cases} [1,0,\ldots,0] & p = p_1 \\ \ldots \\ [0,0,\ldots,1] & p = p_N \end{cases}$$

Wherein, $p_1$ to $p_n$ denote probability values generated by the architecture parameters of the branches, and p is a parameter for selecting an activation function. Based on a relationship between the p value and the probability value, a content of g is determined, and is utilized for representing whether the branches are activated or not. The mixed operation $m_o$ function is simplified by the binarization gate function to obtain:

$$m_o^{Binary}(x) = \sum_{i=1}^{N} g_i o_i(x) = \begin{cases} o_1(x) & p = p_1 \\ \ldots \\ o_N(x) & p = p_N \end{cases}$$

Wherein $m_o^{binary}$ (x) is simplified $m_o^{NAS}$ (x). A specific selection manner for p may vary based on the type of the target parameter. For example, in an embodiment, the process of the activation branch corresponding to the directed edges is determined based on the target parameter includes:

At step S51: the activation branches are randomly determined in response to the target parameter is the weight parameter.

At step S52: the activation branches are selected based on a polynomial distributed sampling principle in response to the target parameter is the architecture parameter.

The activation branches are randomly selected in response to the target parameter is the weight parameter. In an embodiment, a random number generator may be utilized for selecting one value from a set constituted by $p_1$ to $p_n$ to serve as the p value, and then, the value g of the binarization gate function is determined to finish activation branches selection. In response to the target parameter is the architecture parameter, the activation function is selected based on the polynomial distributed sampling principle, two branches are selected from the N branches each time to serve as the activation branches, and mask processing is performed on other branches.

Correspondingly, the parameters of the initial model are adjusted based on the target loss value may include:

At step S43: target parameters corresponding to activation branches are updated based on the target loss value.

A historical parameter of previous update is different from the target parameter in parameter type, that is, the weight parameter and the architecture parameter are alternately updated. It is to be understood that the consumption needed in the initial model training process is reduced to the level of training the ordinary network model by ensuring the number of the activation branches to be far less than the number of all branches, thereby reducing consumption of the calculation resources.

It is to be understood that for different types of target models, different manners may be adopted for parameter update. In an embodiment, the process of a target parameter is updated corresponding to the activation branches based on the target loss value includes:

At step S61: in response to the target parameter is the weight parameter, a weight parameter of the activation branches is updated based on the target loss value through a random gradient descent method.

At step S62: in response to the target parameter is the architecture parameter, by the target loss value, an update parameter is calculated based on a preset update rule, and the architecture parameter of the activation branches is updated based on the update parameter.

In an embodiment, in response to the target parameter is the weight parameter, the random gradient descent method may be adopted for update. In response to the target parameter is the architecture parameter, the preset update rule is preset and specifies a computing mode for the update parameter. This embodiment does not limit the content of the preset update rule, and in an embodiment, the preset update rule is as follows:

$$\frac{\partial L}{\partial a_i} = \sum_{j=1}^{N} \frac{\partial L}{\partial p_j} \frac{\partial p_j}{\partial a_i} \approx \sum_{j=1}^{N} \frac{\partial L}{\partial g_j} \frac{\partial p_j}{\partial a_i} =$$

$$\sum_{j=1}^{N} \frac{\partial L}{\partial g_j} \frac{\partial \frac{\exp(a_j)}{\sum_k \exp(a_k)}}{\partial a_i} = \sum_{j=1}^{N} \frac{\partial L}{\partial g_j} p_j(\delta_{ij} - p_i)$$

Wherein, when i=j, $\delta_{ij}$=1, and when i≠j, $\delta_{ij}$=0. L denotes the target loss value.

In an embodiment, a process of the target loss value is computed may be as below:

The situation shown in Table 1 is adopted as an example, and the embedding layer obtains a client side latency based on the input, namely:

$$L_{User} = f(T, C, H, W, D) * L_{Server}$$

Wherein T denotes the network layer type, f (T, C, H, W, D) denotes a mapping matrix formed by the preset network layer latency information, and Table 1 is essentially a lookup table for all the network layers.

Through the above mapping, a latency of one module in the initial model is:

$$E[\text{latency}_i] = \sum_j p_j^i \times F(o_j^i)$$

E[latency$_i$] denotes a latency of an i$^{th}$ module, F denotes the above mapping matrix, and F ($\sigma_j^i$) denotes a prediction latency, p$_j^i$ denotes the probability value generated by the architecture parameter of the i$^{th}$ module and the j$^{th}$ branch, of denotes the i$^{th}$ module, the j$^{th}$ branch optional basic operation.

In this embodiment, the embedding layer is adopted to determine the target latency data, and thus, E[latency$_i$] may be equivalent to:

$$E[\text{latency}_i] = \sum_j p_j^i \times \text{Embedding}(o_j^i)$$

Embedding denotes embedding layer processing. Thus, a total latency constituted by all modules, namely, the target latency data is equal to:

$$E[\text{latency}] = \sum_i E[\text{latency}_i]$$

E[latency] denotes the target latency data. After the target latency data is obtained, this disclosure generates the target loss value by combining a latency loss and a precision loss and adding weight decay. The target loss value is as follows:

$$\text{loss} = \text{loss}_{CE} + \lambda_1 \|w\|_2^2 + \lambda_2 \sum_j p_j^i \times \text{Embedding}(o_j^i)$$

Wherein, loss is the above L, namely, the target loss value. $\lambda_1$ and $\lambda_2$ denote weighted values, w denotes a weight decay constant, and loss$_{CE}$ denotes the precision loss.

The process of the target model is obtained based on the initial model in response to the training completion condition being satisfied may include:

At step S71: branch weights corresponding to multiple branches are calculated based on the architecture parameter and the weight parameter.

At step S72: a highest branch weight of each directed edge is determined, and branches corresponding to non-highest branch weights in the initial model are clipped to obtain the target model.

This embodiment does not limit a computing mode for the branch weight, and the branch weight may be obtained by multiplying the architecture parameter and the weight parameter. After the branch weights are obtained, a model structure constituted by branches corresponding to the highest branch weight is the best, and thus, after the branches corresponding to the non-highest branch weights are clipped, the model constituted by the remaining branches is the target model.

It should be noted that the neural architecture search process mentioned by this disclosure consumes few calculation resources, and thus, it is not necessary to adopt the proxy task training manner, but to directly adopt full training data corresponding to a target task required to be finished by the target model for training, thereby improving the performance of the target model.

For example, when the image classification task is performed by CIFAR10 and ImageNet data sets, different from a conventional NAS manner that a small number of modules are first trained on CIFAR10, then transferred to the ImageNet data set and piled to form a model, the NAS manner provided by this disclosure may directly perform network architecture search on the CIFAR10 data set, or the ImageNet data set or target hardware.

A backbone network (i.e, a backbone network) of the hyperparameter network selects PyramidNet, DenseNet, MobileNet or other classic networks, and meanwhile is beneficially modified, for example, a 3*3Conv layer (a 3*3 convolutional layer) in the PyramidNet is optimized to be tree-structured, having a depth being 3 and 2 branches at each leaf node.

In this embodiment, thousands of images are randomly sampled, and a training set and a validation set are divided with the ratio of 0.7 to 0.3 for network architecture search. An adopted optimizer may select algorithms such as Adam, SGD, Momentum, NAG and AdaGrad, and a loss function is derived by a gradient-based algorithm for iterative update of the hyperparameter network and the architecture parameter.

A network model training apparatus provided by an embodiment of this disclosure is introduced below, and the network model training apparatus described below and the network model training method described above may be cross-referenced correspondingly.

Figure 3:
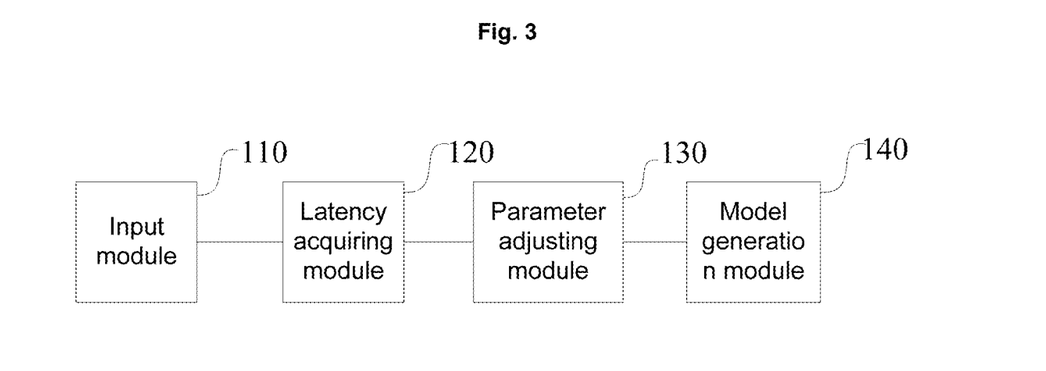
FIG. 3 is a schematic structural diagram of a network model training apparatus based on an embodiment of this disclosure.

Refer to FIG. 3, and FIG. 3 is a schematic structural diagram of a network model training apparatus based on an embodiment of this disclosure, including:

an input module 110 is configured to acquire training data, and input the training data into an initial model to obtain output data, wherein the initial model includes an embedding layer, the embedding layer is constructed based on preset network layer latency information, the preset network layer latency information includes network layer types and at least two types of latency data corresponding to each network layer type, and each type of latency data corresponds to different device types;

a latency acquiring module 120 is configured to input a current device type, a target network layer type of each target network layer in the initial model into the embedding layer to obtain target latency data corresponding to other device type;

a parameter adjusting module 130 is configured to calculate a target loss value based on the target latency data, the training data and the output data, and adjust parameters of the initial model based on the target loss value; and a model generation module 140 is configured to obtain a target model based on the initial model in response to a training completion condition is satisfied.

In an embodiment, the network model training apparatus further includes:

a preset network model determine module is configured to determine multiple network layers and multiple preset network models with each network layer of the multiple network layers;

a first latency data acquiring module is configured to train the preset network models on devices corresponding to various device types to obtain first latency data corresponding to the various device types;

a second latency data acquiring module is configured to obtain second latency data corresponding to the each network layer of the multiple network layers based on the first latency data; and a preset network layer latency information generation module is configured to generate preset network layer latency information based on a corresponding relationship among the second latency data, the network layer type of the each network layer, and a device type of multiple device types.

In an embodiment, the parameter adjusting module 130 includes:

a precision loss value calculation unit is configured to obtain a precision loss value based on training data and output data; and a weighting summation unit is configured to perform weighting summation based on the precision loss value and target latency data to obtain a target loss value.

In an embodiment, the initial model is a hyperparameter network based on a neural network model training rule, and the initial model is the hyperparameter network constructed by utilizing a search space. A network architecture of the initial model corresponds to a target directed acyclic graph, the target directed acyclic graph has multiple directed edges, and each directed edge has multiple branches.

The input module 110 includes:

a parameter determine unit is configured to determine a target parameter; and a branch activation unit is configured to determine, based on the target parameter, activation branches corresponding to the each directed edge, and process, based on the activation branches, training data to obtain output data.

Correspondingly, the parameter adjusting module 130 includes:

an update unit is configured to update a target parameter corresponding to the activation branches based on a target loss value, wherein a historical parameter of previous update is different from the target parameter in parameter type.

In an embodiment, the branch activation unit includes:

a random activation subunit is configured to randomly determine the activation branches in response to the target parameter is a weight parameter; and a distributed sampling subunit is configured to select the activation branches based on a polynomial distributed sampling principle in response to the target parameter is an architecture parameter.

In an embodiment, the update unit includes:

a random gradient update subunit is configured to update, in a case that a target parameter is a weight parameter, the weight parameter of the activation branches based on a target loss value through a random gradient descent method; and a rule update subunit, configured to calculate, in response to the target parameter is the architecture parameter, an update parameter by utilizing the target loss value based on a preset update rule, and update the architecture parameter of the activation branches based on the update parameter.

In an embodiment, the model generation module 140 includes:

a weight calculation unit is configured to calculate, through the architecture parameter and the weight parameter, branch weights corresponding to each branches; and a clip unit is configured to determine a highest branch weight of each directed edge, and clip branches corresponding to non-highest branch weights in the initial model to obtain the target model.

In an embodiment, the preset network layer latency information generation module includes: a latency data selection unit is configured to input a current device type, each target network layer type and target data into the embedding layer to obtain target latency data corresponding to the target data, wherein the target data includes an input data scale and/or a target device type.

An electronic apparatus provided by an embodiment of this disclosure is introduced below, and the electronic apparatus described below and the network model training method described above may be cross-referenced correspondingly.

Figure 4:
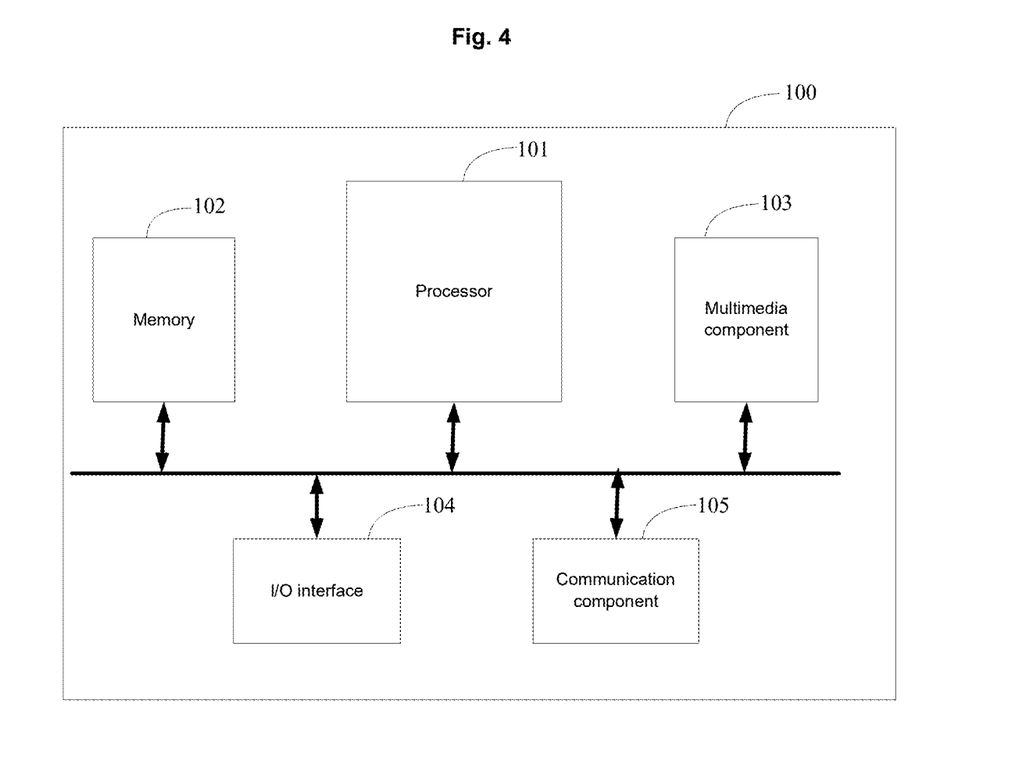
FIG. 4 is a schematic structural diagram of an electronic apparatus based on an embodiment of this disclosure.

Refer to FIG. 4, and FIG. 4 is a schematic structural diagram of an electronic apparatus based on an embodiment of this disclosure. The electronic apparatus 100 may include a processor 101 and a memory 102, and may further include one or more of a multimedia component 103, an information input/information output (I/O) interface 104 and a communication component 105.

The processor 101 is configured to control overall operation of the electronic apparatus 100 to finish all or part of the steps in the above network model training method. The memory 102 is configured to store multiple types of data to support operation in the electronic apparatus 100, and the data may include instructions for any disclosure program or method used for being operated on the electronic apparatus 100, and data related to the disclosure program. The memory 102 may be realized by any type of volatile or non-volatile memory apparatus or a combination thereof, such as one or more of a static random access memory (Static Random Access Memory, SRAM), an electrically erasable programmable read-only memory (Electrically Erasable Programmable Read-Only Memory, EEPROM), an erasable programmable read-only memory (Erasable Programmable Read-Only Memory, EPROM), a programmable read-only memory (Programmable Read-Only Memory, PROM), a read-only memory (Read-Only Memory, ROM), a magnetic memory, a flash memory, a magnetic disk, or an optical disk.

The multimedia component 103 may include a screen and an audio component. The screen may be a touch screen, and the audio component is configured to output and/or input an audio signal. For example, the audio component may include a microphone configured to receive an external audio signal. The received audio signal may be further stored in the memory 102 or transmitted by the communication component 105. The audio component further includes at least one loudspeaker configured to output the audio signal. The I/O interface 104 provides an interface between the processor 101 and another interface module, and the above another interface module may be a keyboard, a mouse, buttons, etc. These buttons may be virtual buttons or physical buttons. The communication component 105 is configured to perform wired or wireless communication between the electronic apparatus 100 and another apparatus. The wireless communication may be Wi-Fi, bluetooth, near field communication (Near Field Communication, NFC), 2G, 3G or 4G, or a combination of one or more thereof, and thus, the corresponding communication component 105 may include a Wi-Fi component, a bluetooth component and an NFC component.

The electronic apparatus 100 may be realized by one or more application integrated circuits (Application Specific Integrated Circuit, ASIC), a digital signal processor (Digital Signal Processor, DSP), a digital signal processing device (Digital Signal Processing Device, DSPD), a programmable logic device (Programmable Logic Device, PLD), a field programmable gate array (Field Programmable Gate Array, FPGA), a controller, a microcontroller, a microprocessor or another electronic element, and is configured to perform the network model training method provided by the above embodiment.

A computer-readable storage medium provided by an embodiment of this disclosure is introduced below, and the computer-readable storage medium described below and the network model training method described above may be cross-referenced correspondingly.

This disclosure further provides a computer-readable storage medium, storing a computer program. The computer program, when executed by a processor, implementing the steps of the above network model training method.

The computer-readable storage medium may include a U disk, a mobile hard disk, a read-only memory (Read-Only Memory, ROM), a random access memory (Random Access Memory, RAM), a magnetic disk, or an optical disk or other media capable of storing program code.

The embodiments in the specification are progressively described, each embodiment emphasizes points different from those in the other embodiments, and the same and similar parts of the embodiments can be cross-referenced. The apparatus disclosed by the embodiment corresponds to the method disclosed by the embodiment, and thus, the description is simple. And please refer to the description of the method part for associated parts.

Those skilled in the art can further realize that units and algorithm steps in multiple examples described in the embodiments disclosed in the specification may be realized by electronic hardware, computer software or a combination thereof, and to clearly describe interchangeability of the hardware and the software, the above description has generally described compositions and steps of multiple examples based on functions. Performing the functions in a hardware manner or a software manner is decided by specific disclosures and design constraint conditions of the technical solutions. Those skilled in the art may use different methods for realizing functions described by each specific disclosure, which cannot exceed the scope of this disclosure.

The steps in the method or algorithm described in the embodiments disclosed in the specification may be implemented directly by hardware, a software module executed by a processor, or a combination of both. The software module may be arranged in the random access memory (RAM), an internal memory, the read-only memory (ROM), an electrically programmable ROM, the electrically erasable programmable ROM, a register, a hard disk, a removable disk, a CD-ROM or any other form of storage medium known in the technical field.

Finally, it should be further noted that relation terms such as first and second in the specification are only used for distinguishing one entity or operation from another entity or operation rather than necessarily requiring or implying any practical relation or sequence between the entities or operations. In addition, terms "comprise", "include" or any other variation thereof are intended to cover a non-exclusive inclusion, and thus a process, a method, an object or a device including a series of elements not only includes those elements but also includes other elements not clearly listed, or further includes inherent elements for the process, the method, the object or the device.

The applies examples to elaborate the principle and the implementation of this disclosure, and the description of the above embodiments is only used for assisting in understanding the method and a core concept of this disclosure; and meanwhile, those of ordinary skill in the art may change the specific implementation and the disclosure scope based on the concept of this disclosure. In conclusion, the content of the specification should not be understood as limitations on this disclosure.

What is claimed is:

1. A network model training method, comprising:
acquiring, by a processor, training data, and inputting the training data into an initial model to obtain output data, wherein the initial model comprises an embedding layer of neural networks, the embedding layer is constructed based on preset network layer latency information, the preset network layer latency information comprises network layer types and at least two types of latency data corresponding to each network layer type, and each type of latency data corresponds to different device types, the network layer types refer to a type of each network layer in a network model;
inputting, by the processor, a current device type and a target network layer type of a target network layer in the initial model into the embedding layer to obtain target latency data corresponding to other device type;
calculating, by the processor, a target loss value based on the target latency data, the training data and the output data, and adjusting parameters of the initial model based on the target loss value; and
obtaining, by the processor, a target model based on the initial model in response to a training completion condition is satisfied;
wherein the training data is audio data, the target model is an audio processing model, the audio processing model is configured to perform audio processing;
based on a target delay data, obtain the target loss value which reflects an execution delay of the initial model on other device types corresponding to devices;
based on the target loss value, adjust parameters of the initial model to ensure compatibility with devices corresponding to other device types, and to achieve a minimum delay for the target model when running on devices corresponding to other device types.

2. The network model training method as claimed in claim 1, wherein a process of generating the preset network layer latency information comprises:
determining, by the processor, multiple network layers and multiple preset network models with each network layer of the multiple network layers;
training, by the processor, the multiple preset network models on devices corresponding to multiple device types to obtain first latency data corresponding to the multiple device types;
respectively obtaining, by the processor, second latency data corresponding to the each network layer of the multiple network layers based on the first latency data; and
generating, by the processor, the preset network layer latency information based on a corresponding relationship among the second latency data, the network layer type of the each network layer, and a device type of multiple device types.

3. The network model training method as claimed in claim 1, wherein calculating, by the processor, the target loss value based on the target latency data, the training data and the output data comprises:
obtaining, by the processor, a precision loss value based on the training data and the output data; and performing, by the processor, weighting summation based on the precision loss value and the target latency data to obtain the target loss value.

4. The network model training method as claimed in claim 1, wherein the initial model is a hyperparameter network based on a neural network model training rule, and the initial model is the hyperparameter network constructed by utilizing a search space, a network architecture of the initial model corresponds to a target directed acyclic graph, the target directed acyclic graph has multiple directed edges, and each directed edge has multiple branches;
inputting, by the processor, the training data into the initial model to obtain the output data comprises:
determining, by the processor, a target parameter; and
determining, by the processor, activation branches corresponding to the each directed edge based on the target parameter, and processing the training data based on the activation branches to obtain the output data; and
adjusting, by the processor, parameters of the initial model based on the target loss value comprises:
updating, by the processor, the target parameter corresponding to the activation branches based on the target loss value, wherein a historical parameter of previous update being different from the target parameter in parameter type.

5. The network model training method as claimed in claim 4, wherein determining, by the processor, the activation branch corresponding to the each directed edge based on the target parameter comprises:
randomly determining, by the processor, the activation branches in response to the target parameter is a weight parameter; and
selecting, by a processor, the activation branches based on a polynomial distributed sampling principle in response to the target parameter is an architecture parameter.

6. The network model training method as claimed in claim 5, wherein updating the target parameter corresponding to the activation branches based on the target loss value comprises:
updating, by the processor, in response to the target parameter is the weight parameter, a weight parameter of the activation branches based on the target loss value through a random gradient descent method; and
calculating, by the processor, in response to the target parameter is the architecture parameter, an update parameter through utilizing the target loss value based on a preset update rule, and updating the architecture parameter of the activation branches based on the update parameter.

7. The network model training method as claimed in claim 4, wherein obtaining a target model based on the initial model comprises:
calculating, by the processor, through the architecture parameter and the weight parameter, a branch weight corresponding to each branch; and
determining, by the processor, a highest branch weight of each directed edge, and clipping branches corresponding to non-highest branch weights in the initial model to obtain the target model.

8. The network model training method as claimed in claim 1, wherein inputting, by the processor, the current device type and the target network layer type of the target network layer in the initial model into the embedding layer to obtain target latency data corresponding to other device type comprises:
inputting, by the processor, the current device type, each target network layer type and target data into the embedding layer to obtain the target latency data corresponding to the target data, wherein the target data comprises an input data scale and/or a target device type.

9. The network model training method as claimed in claim 1, wherein the embedding layer is constructed based on the preset network layer latency information comprises:
acquiring, by the processor, one-dimensional array based on the preset network layer latency information; and
building, by the processor, the embedding layer based on the one-dimensional array.

10. The network model training method as claimed in claim 4, wherein the neural network model training rule is used to generate the initial model during network architecture search.

11. The network model training method as claimed in claim 4, wherein determining, by the processor, activation branches corresponding to the each directed edge based on the target parameter comprises:
determining, by the processor, the activation branches corresponding to the each directed edge based on the target parameter and a binarization gate function.

12. The network model training method as claimed in claim 5, wherein randomly determining, by the processor, the activation branches in response to the target parameter is the weight parameter comprises:
generating, by the processor, probability values by an architecture parameter of each branch;
randomly selecting, by the processor, a parameter from the probability values through a random number generator; and
determining, by the processor, the activation branches based on the parameter.

13. The network model training method as claimed in claim 5, wherein selecting, by the processor, the activation branches based on the polynomial distributed sampling principle in response to the target parameter is the architecture parameter comprises:
selecting, by the processor, two branches from the multiple branches as the activation branches based on the polynomial distributed sampling principle.

14. The network model training method as claimed in claim 7, wherein calculating, by the processor, through the architecture parameter and the weight parameter, the branch weight corresponding to each branch comprises:
calculating, by the processor, the branch weight corresponding to each branch based on the product of the architecture parameter and the weight parameter.

15. The network model training method as claimed in claim 8, wherein the input data scale comprises a channel (C-channel), a height (H-height), a width (W-width) and a depth (D-depth).

16. The network model training method as claimed in claim 3, wherein performing, by the processor, weighting summation based on the precision loss value and the target latency data to obtain the target loss value comprises:
performing, by the processor, weighting summation based on the precision loss value, the target latency data and a weight decay constant to obtain the target loss value.

17. An electronic apparatus, comprising a memory and a processor, wherein the memory is configured to store a computer program; and
the processor is configured to execute the computer program, cause the processor to:
acquire training data, and input the training data into an initial model to obtain output data, wherein the initial model comprises an embedding layer of neural networks, the embedding layer is constructed based on preset network layer latency information, the preset network layer latency information comprises network layer types and at least two types of latency data corresponding to each network layer type, and each type of latency data corresponds to different device types, the network layer types refer to a type of each network layer in a network model;

input a current device type and a target network layer type of a target network layer in the initial model into the embedding layer to obtain target latency data corresponding to other device type;

calculate a target loss value based on the target latency data, the training data and the output data, and adjust parameters of the initial model based on the target loss value; and obtain a target model based on the initial model in response to a training completion condition is satisfied;

wherein the training data is audio data, the target model is an audio processing model, the audio processing model is configured to perform audio processing;

based on a target delay data, obtain the target loss value which reflects an execution delay of the initial model on other device types corresponding to devices;

based on the target loss value, adjust parameters of the initial model to ensure compatibility with devices corresponding to other device types, and to achieve a minimum delay for the target model when running on devices corresponding to other device types.

18. The electronic apparatus as claimed in claim 17, wherein the processor is configured to execute the computer program, cause the processor to:

determine multiple network layers and multiple preset network models with each network layer of the multiple network layers;

train the multiple preset network models on devices corresponding to multiple device types to obtain first latency data corresponding to the multiple device types;

respectively obtain second latency data corresponding to the each network layer of the multiple network layers based on the first latency data; and generate the preset network layer latency information based on a corresponding relationship among the second latency data, the network layer type of the each network layer, and a device type of multiple device types.

19. The electronic apparatus as claimed in claim 17, wherein the processor is configured to execute the computer program, cause the processor to:

obtain a precision loss value based on the training data and the output data; and perform weighting summation based on the precision loss value and the target latency data to obtain the target loss value.

20. A non-transitory computer-readable storage medium, configured to store a computer program, wherein the computer program, when executed by a processor, cause the processor to:

acquire training data, and input the training data into an initial model to obtain output data, wherein the initial model comprises an embedding layer of neural networks, the embedding layer is constructed based on preset network layer latency information, the preset network layer latency information comprises network layer types and at least two types of latency data corresponding to each network layer type, and each type of latency data corresponds to different device types;

input a current device type and a target network layer type of a target network layer in the initial model into the embedding layer to obtain target latency data corresponding to other device type;

calculate a target loss value based on the target latency data, the training data and the output data, and adjust parameters of the initial model based on the target loss value; and obtain a target model based on the initial model in response to a training completion condition is satisfied;

wherein the training data is audio data, the target model is an audio processing model, the audio processing model is configured to perform audio processing;

based on a target delay data, obtain the target loss value which reflects an execution delay of the initial model on other device types corresponding to devices;

based on the target loss value, adjust parameters of the initial model to ensure compatibility with devices corresponding to other device types, and to achieve a minimum delay for the target model when running on devices corresponding to other device types.

* * * * *